(12) United States Patent
Igarashi (10) Patent No.: US 12,047,710 B2
(45) Date of Patent: Jul. 23, 2024

(54) REMOTE MONITORING DEVICE, REMOTE MONITORING SYSTEM, AND REMOTE MONITORING METHOD

(71) Applicant: TOYOTA JIDOSHA KABUSHIKI KAISHA, Toyota (JP)

(72) Inventor: Ryo Igarashi, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/733,324

(22) Filed: Apr. 29, 2022

(65) Prior Publication Data

US 2022/0360745 A1 Nov. 10, 2022

(30) Foreign Application Priority Data

May 7, 2021 (JP) .................................. 2021-079280

(51) Int. Cl.
| | | |
|---|---|---|
| *H04N 7/18* | (2006.01) | |
| *B60W 60/00* | (2020.01) | |
| *G06T 7/50* | (2017.01) | |
| *H04N 23/698* | (2023.01) | |
| *H04N 23/90* | (2023.01) | |

(52) U.S. Cl.
CPC .......... *H04N 7/181* (2013.01); *B60W 60/001* (2020.02); *G06T 7/50* (2017.01); *H04N 23/698* (2023.01); *H04N 23/90* (2023.01); *B60W 2420/403* (2013.01); *B60W 2520/10* (2013.01); *B60W 2530/201* (2020.02); *B60W 2554/802* (2020.02);
(Continued)

(58) Field of Classification Search
CPC ...... H04N 7/181; H04N 23/90; H04N 23/698; G06T 7/50; G06T 2207/30261; B60W 60/001; B60W 2530/201; B60W 2556/45; B60W 2554/802; B60W 2420/42; B60W 2520/10
USPC ......................................................... 348/148
See application file for complete search history.

(56) References Cited

U.S. PATENT DOCUMENTS

| | | | | |
|---|---|---|---|---|
| 8,208,021 | B2 * | 6/2012 | Unoura | ..................... G06T 7/12 |
| | | | | 348/148 |
| 2014/0247180 | A1 * | 9/2014 | Moriuchi | ................ G01S 7/354 |
| | | | | 342/90 |

(Continued)

FOREIGN PATENT DOCUMENTS

| | | |
|---|---|---|
| JP | 2009-286172 A | 12/2009 |
| JP | 2011-235847 A | 11/2011 |

(Continued)

*Primary Examiner* — Christopher S Kelley
*Assistant Examiner* — Asmamaw G Tarko
(74) *Attorney, Agent, or Firm* — Sughrue Mion, PLLC (57) ABSTRACT

A remote operator that remotely assists in traveling the autonomous traveling vehicle refer to a remote monitoring terminal. A remote monitoring device acquires data of a plurality of sensors mounted on the autonomous traveling vehicle, executes an image generation processing for generating an around-view of the vehicle by processing the data, calculates the lane width of the lane traveled by the vehicle based on the map information, calculates the vehicle width ratio of the vehicle with respect to the lane width, and when the vehicle width ratio is greater than a predetermined determination threshold, provides the generated around-view by the image generation processing to the remote monitoring terminal.

8 Claims, 8 Drawing Sheets

(52) U.S. Cl.
CPC .................. *B60W 2556/45* (2020.02); *G06T 2207/30261* (2013.01)

(56) References Cited

U.S. PATENT DOCUMENTS

| | | | | |
|---|---|---|---|---|
| 2015/0332114 A1* | 11/2015 | Springer | ................... | G06T 7/97 348/148 |
| 2016/0162743 A1* | 6/2016 | Chundrlik, Jr. | ........ | G06V 20/58 348/148 |
| 2016/0176341 A1* | 6/2016 | Raghu | ................... | G06V 10/56 348/148 |
| 2016/0176345 A1* | 6/2016 | Lee | ....................... | B60Q 9/008 382/104 |
| 2016/0180182 A1* | 6/2016 | Gupta | ................... | G06V 20/58 348/148 |
| 2016/0196656 A1* | 7/2016 | Cund | ..................... | B60W 40/06 348/148 |
| 2016/0379070 A1* | 12/2016 | Kasaoki | ............... | B60W 30/14 348/148 |
| 2017/0330463 A1* | 11/2017 | Li | .......................... | G08G 1/015 |
| 2018/0087907 A1* | 3/2018 | DeBitetto | ............ | B60W 30/00 |
| 2018/0165527 A1* | 6/2018 | Park | ....................... | G08G 1/166 |
| 2018/0197021 A1* | 7/2018 | Lee | ...................... | G06V 20/588 |
| 2018/0211117 A1* | 7/2018 | Ratti | .................... | G06V 10/764 |
| 2018/0300559 A1* | 10/2018 | Raghu | .............. | B60W 30/18163 |
| 2018/0349711 A1* | 12/2018 | Prasad | ..................... | G01S 15/08 |
| 2019/0064322 A1* | 2/2019 | Chiang | ................... | G01S 7/4802 |
| 2020/0012286 A1* | 1/2020 | Delp | .................... | G06V 20/588 |
| 2020/0118283 A1* | 4/2020 | Lee | ......................... | G06V 20/58 |
| 2020/0180656 A1* | 6/2020 | Kim | ........................ | G06V 20/56 |
| 2020/0184654 A1* | 6/2020 | Kim | .......................... | G06T 7/74 |
| 2020/0249682 A1* | 8/2020 | Kojo | ........................ | G08G 1/00 |
| 2020/0283024 A1* | 9/2020 | Iwasaki | ........... | B60W 30/18163 |
| 2020/0290624 A1* | 9/2020 | Kumano | ............ | B60W 10/20 |
| 2020/0372262 A1* | 11/2020 | Ma | ......................... | B60W 40/04 |
| 2021/0055732 A1* | 2/2021 | Caldwell | ................ | G08G 1/167 |
| 2021/0056853 A1* | 2/2021 | Caldwell | .............. | G05D 1/0219 |
| 2021/0094577 A1* | 4/2021 | Shalev-Shwartz | ......................... | B60W 30/0953 |
| 2021/0101616 A1* | 4/2021 | Hayat | ..................... | G06F 18/21 |
| 2021/0118168 A1* | 4/2021 | Golinsky | ............ | G08G 1/09623 |
| 2022/0205810 A1* | 6/2022 | Wada | ...................... | G06V 10/74 |
| 2022/0266823 A1* | 8/2022 | Arima | .................. | B60W 50/00 |
| 2022/0324482 A1* | 10/2022 | Guo | ..................... | B60W 30/095 |

FOREIGN PATENT DOCUMENTS

| | | |
|---|---|---|
| JP | 2012-071833 A | 4/2012 |
| JP | 2020-003890 A | 1/2020 |
| JP | 2020-161039 A | 10/2020 |

* cited by examiner

REMOTE MONITORING DEVICE, REMOTE MONITORING SYSTEM, AND REMOTE MONITORING METHOD

CROSS-REFERENCE TO RELATED APPLICATION

The present application claims priority under 35 U.S.C. § 119 to Japanese Patent Application No. 2021-079280, filed May 7, 2021, the contents of which application are incorporated herein by reference in their entirety.

BACKGROUND

Field

The present invention relates to a remote monitoring device, a remote monitoring system, and a remote monitoring method.

Background Art

JP2020-003890A discloses a technique related to a vehicle remote monitoring system. According to this technique, the vehicle remote monitoring system makes an object within a predetermined distance to be an obstacle, and converts an image including an obstacle into an overhead image. The converted image is displayed on the image display unit of a control center.

SUMMARY

When a remote operator remotely assists the operation of an autonomous traveling vehicle, there is a problem that the remote operator is difficult to grasp the vehicle width interval of the autonomous traveling vehicle. As a countermeasure against this problem, it is effective to display an overhead around-view, as in the above-mentioned technique. However, more displays provided to the remote operator is not always better. Providing multiple displays at once can cause confusion for remote operators. In this manner, it is desirable that the display provided to the remote operator provide the necessary conditions at the most appropriate time. The above technique does not adequately consider the timing of providing an around-view to a remote operator.

The present disclosure has been made in view of the above problems, and an object thereof is to provide a technique capable of enhancing the convenience of remote monitoring by a remote operator by providing an around-view at an appropriate timing.

The present disclosure provides a remote monitoring device for achieving the above object. The remote monitoring device according to the present disclosure is the device that provides an around-view of an autonomous traveling vehicle to a remote monitoring terminal referred to by a remote operator that remotely monitors a traveling of the autonomous traveling vehicle. The remote monitoring device includes one or more memories storing one or more programs, and one or more processors coupled with the one or more memories. The one or more programs is configured to cause the one or more processors to execute acquiring data of a plurality of sensors mounted on the autonomous traveling vehicle, executing an image generation processing to generate an around-view of the autonomous traveling vehicle by processing the data calculating a lane width of a lane in which the autonomous traveling vehicle travels based on map information, calculating a vehicle width ratio of the autonomous traveling vehicle with respect to the lane width, and providing the around-view generated by the image generation processing to the remote monitoring terminal when the vehicle width ratio is larger than a predetermined determination threshold.

In the remote monitoring device of the present disclosure, the one or more processors may be configured to set the determination threshold to a smaller value as a vehicle speed of the autonomous traveling vehicle increases.

In the remote monitoring device of the present disclosure, the one or more processors may be configured to calculate a distance to an obstacle in front of the autonomous traveling vehicle based on the data of the plurality of sensors, and provide the around-view generated by the image generation processing to the remote monitoring terminal when the distance is less than a predetermined determination distance.

In the remote monitoring device of the present disclosure, the one or more processors may be configured to set the determination distance to a larger value as a vehicle speed of the autonomous traveling vehicle increases.

The remote monitoring device of the present disclosure may be mounted with the remote monitoring device or may be mounted with a server connected to the autonomous traveling vehicle via a communication network.

Further, the present disclosure provides a remote monitoring system for achieving the above object. The remote monitoring system according to the present disclosure is the system for displaying an around-view of an autonomous traveling vehicle on a remote monitoring terminal referenced by a remote operator that remotely assists in traveling the autonomous traveling vehicle. The system includes an on-board computer mounted on the autonomous traveling vehicle, and a server connected by a communication network with the on-board computer. The on-board computer and the server are configured to corporate to execute acquiring data of a plurality of sensors mounted on the autonomous traveling vehicle, executing an image generation processing to generate an around-view of the autonomous traveling vehicle by processing the data, calculating a lane width of a lane in which the autonomous traveling vehicle travels based on map information, calculating a vehicle width ratio of the autonomous traveling vehicle with respect to the lane width, and causing the remote monitoring terminal to display the around-view generated by the image generation processing when the vehicle width ratio is larger than a predetermined determination threshold.

In the remote monitoring system according to the present disclosure, the on-board computer may be configured to execute transmitting the around-view generated by the image generation processing to the server when the vehicle width ratio is larger than a predetermined determination threshold. The server may be configured to execute receiving the around-view, and causing the remote monitoring terminal to display the around-view received.

Further, the present disclosure provides a remote monitoring method for achieving the above object. The remote monitoring method according to the present disclosure is a remote monitoring method for a computer to cause a remote monitoring terminal referenced by a remote operator that remotely assists in traveling the autonomous traveling vehicle to display an around-view of the autonomous traveling vehicle. The computer is configured to execute acquiring data of a plurality of sensors mounted on the autonomous traveling vehicle, executing an image generation processing that processes data to generate an around-view of the autonomous traveling vehicle, calculating a lane width of a lane in which the autonomous traveling vehicle travels based on map information, calculating a vehicle width ratio of the autonomous traveling vehicle with respect to the lane width, and causing the remote monitoring terminal to display the around-view generated by the image generation processing when the vehicle width ratio is larger than a predetermined determination threshold.

The present disclosure also provides a remote monitoring program for achieving the above object. The remote monitoring program according to the present disclosure is a remote monitoring program causing a computer to cause a remote monitoring terminal referenced by a remote operator that remotely assists in traveling the autonomous traveling vehicle to display an around-view of the autonomous traveling vehicle. The remote monitoring program is configured to cause the computer to execute acquiring data of a plurality of sensors mounted on the autonomous traveling vehicle, executing an image generation processing that processes data to generate an around-view of the autonomous traveling vehicle, calculating a lane width of a lane in which the autonomous traveling vehicle travels based on map information, calculating a vehicle width ratio of the autonomous traveling vehicle with respect to the lane width, and causing the remote monitoring terminal to display the around-view generated by the image generation processing when the vehicle width ratio is larger than a predetermined determination threshold.

According to the technique in accordance with the present disclosure, the around-view of the autonomous traveling vehicle is generated by processing the data of the plurality of sensors mounted on the autonomous traveling vehicle. Then, the vehicle width ratio of the autonomous traveling vehicle with respect to the lane width of the lane where the autonomous traveling vehicle travels is calculated, when the vehicle width ratio is greater than a predetermined determination threshold, the generated around-view is provided to the remote monitoring terminal. As described above, according to the technique of the present disclosure, since the around-view can be provided to the remote monitoring terminal referred to by a remote operator at an appropriate timing, the convenience of the remote monitoring by the remote operator can be enhanced.

DETAILED DESCRIPTION

Hereinafter, an embodiment of the present disclosure will be described with reference to the accompanying drawings.

However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically.

1. Schematic Configuration of Remote Monitoring System

Figure 1:
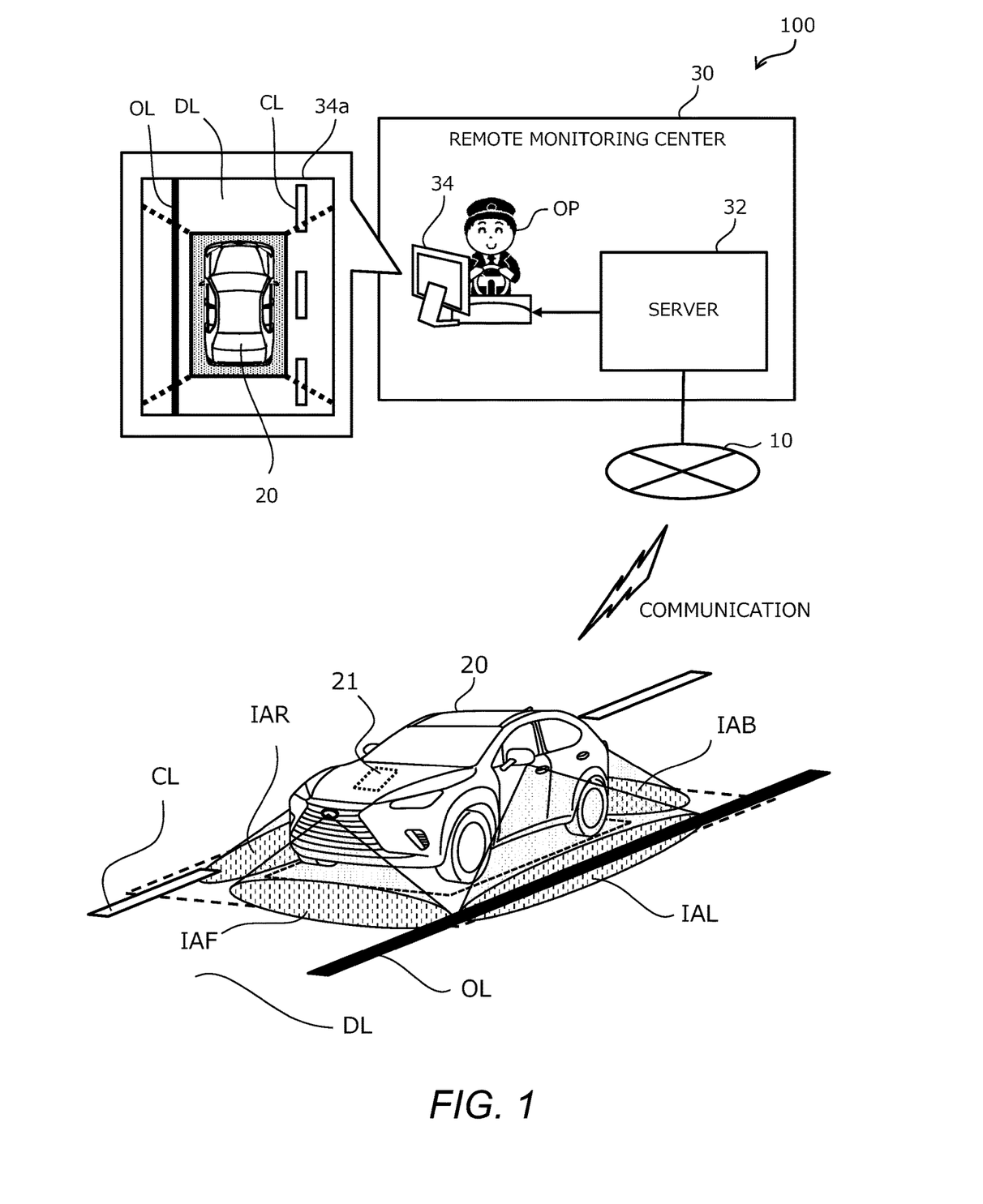
FIG. 1 is a diagram schematically showing a configuration of a remote monitoring system.

FIG. 1 is a diagram schematically showing a configuration of a remote monitoring system common to all embodiments described later. A remote monitoring system 100 is a system for remotely monitoring an autonomous traveling vehicle 20 from a remote monitoring center 30. As the autonomous traveling level of the autonomous traveling vehicle 20, for example, level 4 or level 5 in the level definition of SAE (Society of Automotive Engineers) is assumed. Hereinafter, the autonomous traveling vehicle 20 capable of remote monitoring is simply referred to as a "vehicle 20".

The remote monitoring in the present disclosure includes monitoring for remotely operating the vehicle 20, monitoring for remotely assisting the autonomous traveling vehicle 20 according to situations, and monitoring for confirming surrounding environments of the autonomous traveling vehicle 20. The remote monitoring is performed by a remote operator OP when the vehicle 20 becomes difficult or is expected to become difficult to continue autonomous traveling.

Figure 2:
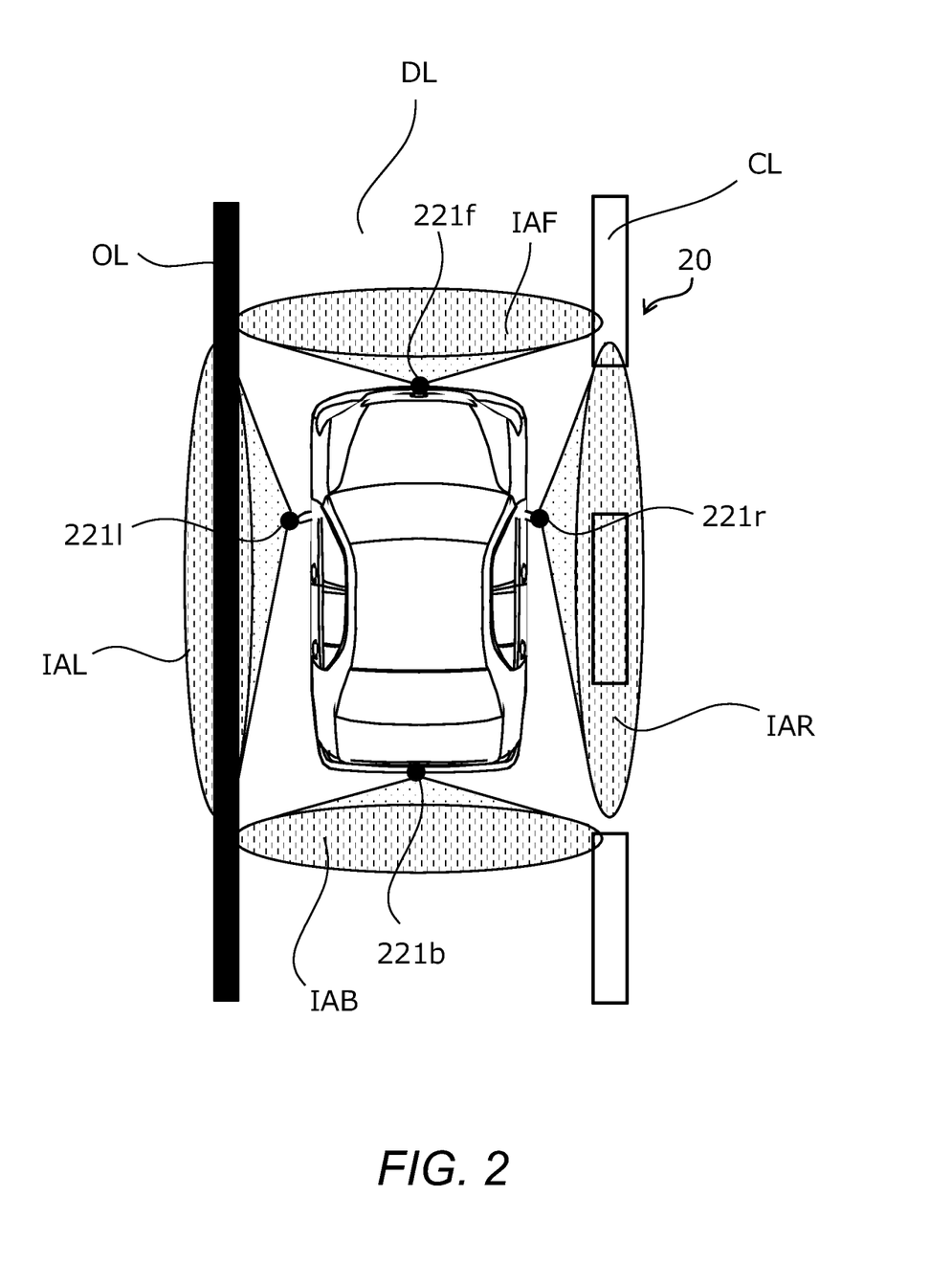
FIG. 2 is an overview of the autonomous traveling vehicle.

FIG. 2 is an overview of the autonomous traveling vehicle. The vehicle 20 includes wide-angle cameras 221 that captures images of surroundings of the vehicle 20 as an external sensor 22. Typically, the wide-angle cameras 221 includes a front camera 221*f*, a rear camera 221*b*, a right side camera 221*r*, and a left side camera 221*l*. The front camera 221*f* is installed in the center of the front end of the vehicle 20. An imaging range IAF of the front camera 221*f* covers at least the front in the traveling direction of the vehicle 20. The rear camera 221*b* is installed in the center of the rear end of the vehicle 20. An imaging range IAB of the rear camera 221*b* covers at least the rear of the traveling direction of the vehicle 20. The right side camera 221*r* and the left side camera 221*l* are respectively installed under the left and right mirrors of the vehicle 20. Imaging ranges IAR, IAL, of the right side camera 221*r* and the left side camera 221*l* cover at least the right side and the left side of the vehicle 20, respectively. For example, when the vehicle 20 is traveling on a driving lane DL, the front, rear, right side, and left side of the driving lane DL are respectively included in the imaging ranges IAF, IAB, IAR, IAL.

Referring to FIG. 1, a server 32 and a remote monitoring terminal 34 are installed in the remote monitoring center 30. The vehicles 20 are connected to the server 32 via a communication network 10 including 4G or 5G. The number of vehicles 20 that can communicate with the server 32 is one or more.

The remote monitoring terminal 34 is an operating terminal for remote monitoring monitored by remote operator OP. At least one and preferably multiple remote monitoring terminals 34 are provided. The remote monitoring center 30 is provided with a number of remote operators OP corresponding to the number of remote monitoring terminals 34.

Each remote monitoring terminal 34 is connected to the server 32 via the communication network including a LAN or an Internet. The remote monitoring center 30 does not necessarily have to be an existing facility. Here, the system including the remote monitoring terminal 34 connected to the server 32 by the communication network is referred to as the "remote monitoring center 30". Thus, the server 32 may be installed on a cloud and the remote monitoring terminal 34 may be installed at a satellite office in each location or at home of remote operator OP.

The vehicle 20 includes an on-board computer 21. The images taken by the wide-angle cameras 221 are input to the on-board computer 21. Based on the input images, the on-board computer 21 generates an around-view which is an image of the vehicle 20 upward from above. This process is referred to as an "image generation processing". In the image generation processing, the on-board computer 21 generates an omni-directional image including the entire circumference of the vehicle 20 by image processing combining the images of the imaging ranges IAF, IAB, IAR, IAL. The on-board computer 21 holds vehicle image data of plan view of the vehicle 20. The on-board computer 21 generates an around-view by combining the vehicle image data in the omni-directional image.

The around-view generated in the image generation processing is transmitted from the on-board computer 21 to the server 32 of the remote monitoring center 30 via the communication network 10. In the remote monitoring center 30, the around-view transmitted from the on-board computer 21 to the server 32 is displayed on an information output unit 34a of the remote monitoring terminal 34. For example, a display device such as a liquid crystal display, an organic EL display, a head mounted display, a touch panel can be used as the information output unit 34a. Since the remote operator OP is not actually riding in the vehicle 20, it is difficult to recognize the sense of vehicle width. The remote operator OP can efficiently monitor the surroundings of the vehicle 20 by an around-view displayed on the information output unit 34a of the remote monitoring terminal 34. For example, when the vehicle 20 is traveling on the driving lane DL, the remote operator OP can recognize the relative position of the vehicle 20 with respect to a center line CL and a road outside line OL by referring to the information output unit 34a of the remote monitoring terminal 34.

2. Problems with Remote Monitoring System

As described above, according to the remote monitoring system 100, the remote operator OP can monitor the vehicle 20 at the remote monitoring center 30 by referring to the around-view. However, the remote operator OP does not always need to refer to the around-view. That is, the around-view may be effective information in a scene in which it is required to grasp the lateral position of the vehicle 20 with respect to the lane, such as a scene where the vehicle 20 is traveling on a lane having a narrow width lane. However, for example, in a scene in which a lane having a wide lane width is traveling straight ahead, the necessity of referring to the around-view is considered to be low. Further, the screen size of the information output unit 34a referred to by the remote operator OP is limited. For this reason, in scenes in which the need for the around-view is low, the remote operator OP may feel troublesome displaying of the around-view.

3. Summary of Features of Remote Monitoring System

The remote monitoring system 100 is controlled to provide an around-view at an appropriate timing according to the road structure. Specifically, the on-board computer 21 calculates the vehicle width ratio (%) of the vehicle 20 to the lane width of the lane. This processing is hereinafter referred to as "vehicle width ratio calculation processing". In the vehicle width ratio calculation processing, the vehicle width ratio is calculated based on a current position of the vehicle 20, a road width and a number of lanes included in map information.

The on-board computer 21 determines whether the display of the around-view is necessary based on a comparison between the calculated vehicle width ratio (%) and a predetermined determination threshold (%). This processing is hereinafter referred to as "around-view necessity determination processing". The greater the vehicle width ratio (%), the greater the difficulty in maintaining a driving lane. That is, the greater the vehicle width ratio of the vehicle 20, the greater the need for the around-view. Therefore, in the around-view necessity determination processing, the on-board computer 21 determines whether the calculated vehicle width ratio (%) is larger than the predetermined determination threshold value (%).

The determination threshold can be used a predetermined fixed value as the threshold at which the vehicle 20 is concerned to be out of the driving lane DL in remote monitoring. Alternatively, the determination threshold may be set according to the vehicle speed of the vehicle 20. This processing is hereinafter referred to as "determination threshold setting processing". In the determination threshold setting processing, the larger the vehicle speed of the vehicle 20 is, the smaller the determination threshold (%) is set. The greater the vehicle speed of the vehicle 20, the greater the difficulty in maintaining a driving lane. That is, the greater the vehicle speed of the vehicle 20, the greater the need for the around-view. Therefore, according to the determination threshold setting processing, it is possible to set the determination threshold according to the necessity of the around-view.

In the around-view necessity determination processing, when it is determined that the vehicle width ratio (%) is larger than the determination threshold value (%), the on-board computer 21 sends the around-view to the server 32 of the remote monitoring center 30. The server 32 displays the received around-view on the information output unit 34a of the remote monitoring terminal 34. According to such control, it is possible to provide the display of the around-view to the remote operator OP at an appropriate timing according to the road structure.

Hereinafter, a detailed configuration and functions of the remote monitoring system 100 will be described. As described therein, the remote monitoring system 100 is technically devised to provide an around-view at an appropriate timing.

4. Configuration of Vehicle According to First Embodiment

Figure 3:
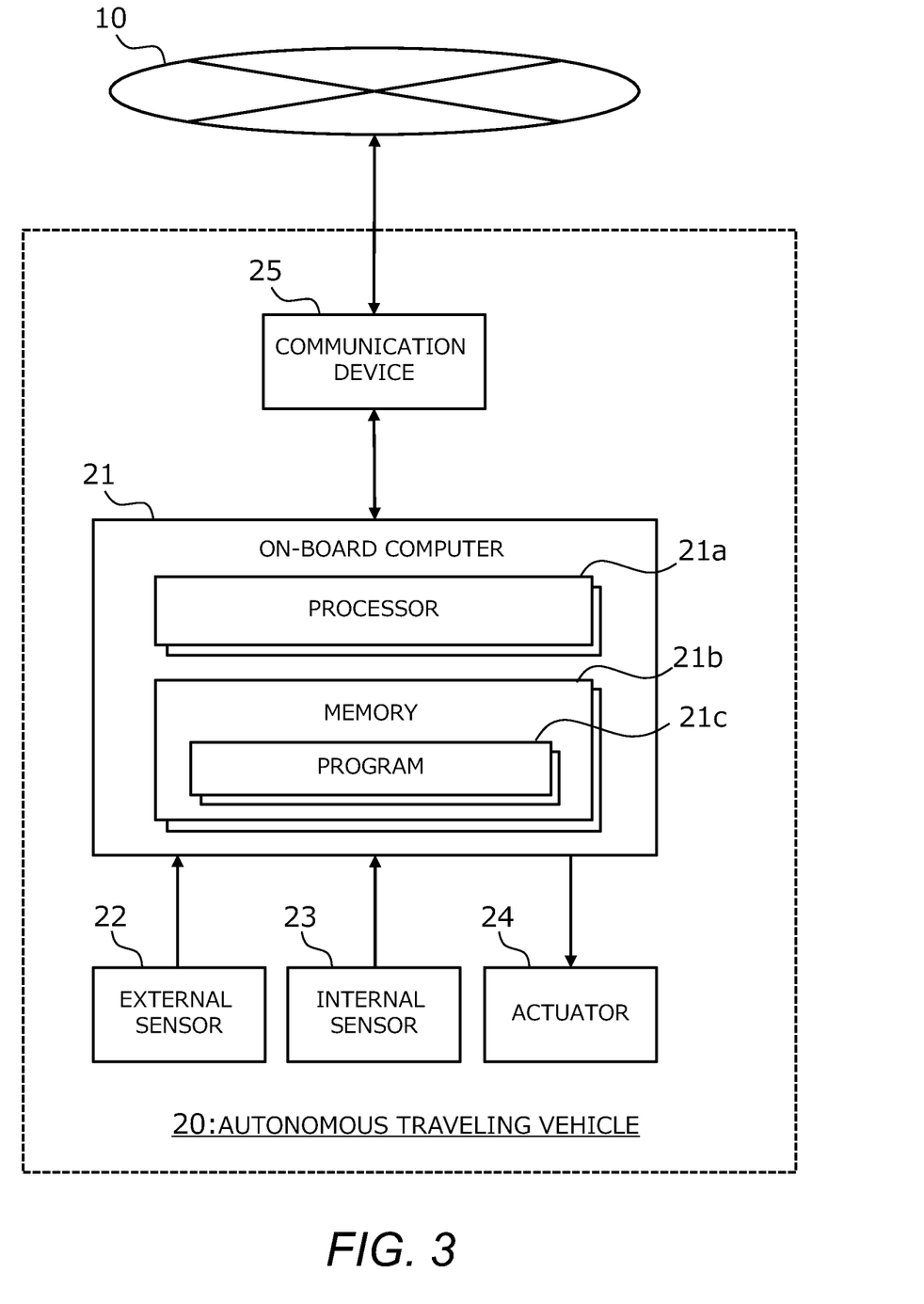
FIG. 3 is a block diagram showing an example of a configuration of the autonomous traveling vehicle.

FIG. 3 is a block diagram showing an example of a configuration of the vehicle 20 in the remote monitoring system 100 according to the first embodiment. The vehicle 20 includes an on-board computer 21. The on-board computer 21 is an assembly of a plurality of ECUs (Electronic Control Unit) mounted on the vehicle 20. The vehicle 20 also includes an external sensor 22, an internal sensor 23, an actuator 24, and a communication device 25. These are connected to the on-board computer 21 using in-vehicle networks such as Controller Area Network.

The on-board computer 21 includes one or more processors 21a (hereinafter, simply referred to as a processor 21a)

and one or more memories 21b (hereinafter, simply referred to as a memory 21b) coupled to the processor 21a. The memory 21b stores one or more programs 21c (hereinafter, simply referred to as a program 21c) executable by the processor 21a and various related information.

When the processor 21a executes the program 21c, various kinds of processing performed by the processor 21a are realized. The program 21c includes, for example, a program for realizing autonomous traveling and a program for realizing remote operation or remote assistance. The program 21c includes a remote monitoring program for causing the on-board computer 21 to function as a remote monitoring device, which will be described later. The program 21c is stored in the memory 21b. The memory 21b may store a map database for managing map information for autonomous traveling.

The external sensor 22 includes the wide angle camera 221 described above, as well as other cameras that image surroundings of the vehicle 20, particularly in the front of the vehicle 20. The camera may be a monocular camera or a stereo camera. A plurality of cameras may be provided, and may image side and rear of the vehicle 20 too. Further, the camera may be shared between autonomous traveling and remote operating, or the camera for autonomous traveling and the camera for remote operating may be provided separately.

The external sensor 22 includes a perception sensor in addition to the camera. The perception sensor is a sensor that acquires information for perceiving surrounding conditions of the vehicle 20. Examples of the perception sensor other than the camera include a LiDAR (Laser Imaging Detection and Ranging) and a millimeter-wave radar. The external sensor 22 also includes a location sensor for detecting the location and orientation of the vehicle 20. As the location sensor, a Global Positioning System (GPS) sensor is exemplified. Information acquired by the external sensor 22 is transmitted to the on-board computer 21.

The inner sensor 23 includes a state sensor that acquires information about the motion of the vehicle 20. As the state sensor, for example, a wheel speed sensor, an acceleration sensor, an angular velocity sensor, and a steering angle sensor are exemplified. The acceleration sensor and the angular velocity sensor may constitute an IMU. Information acquired by the internal sensor 23 is transmitted to the on-board computer 21.

The actuator 24 includes a steering system for steering the vehicle 20, a driving system for driving the vehicle 20, and a braking system for braking the vehicle 20. The steering system includes, for example, a power steering system, a steer-by-wire steering system, and a rear wheel steering system. The driving system includes, for example, an engine system, an EV system, and a hybrid system. The braking system includes, for example, a hydraulic braking system and a power regenerative braking system. The actuator 24 operates by a control signal transmitted from the on-board computer 21.

The communication device 25 is a device for controlling wireless communication with the outside of the vehicle 20. The communication device 25 communicates with the server 32 via the communication network 10. Information processed by the on-board computer 21 is transmitted to the server 32 using the communication device 25. Information processed by the server 32 is captured by the on-board computer 21 using the communication device 25. Also, when vehicle-to-vehicle communication with other vehicles or road-to-vehicle communication with infrastructure facilities is required for autonomous traveling, communication with those external devices is also performed by the communication device 25.

5. Configuration of Remote Monitoring Center According to First Embodiment

Figure 4:
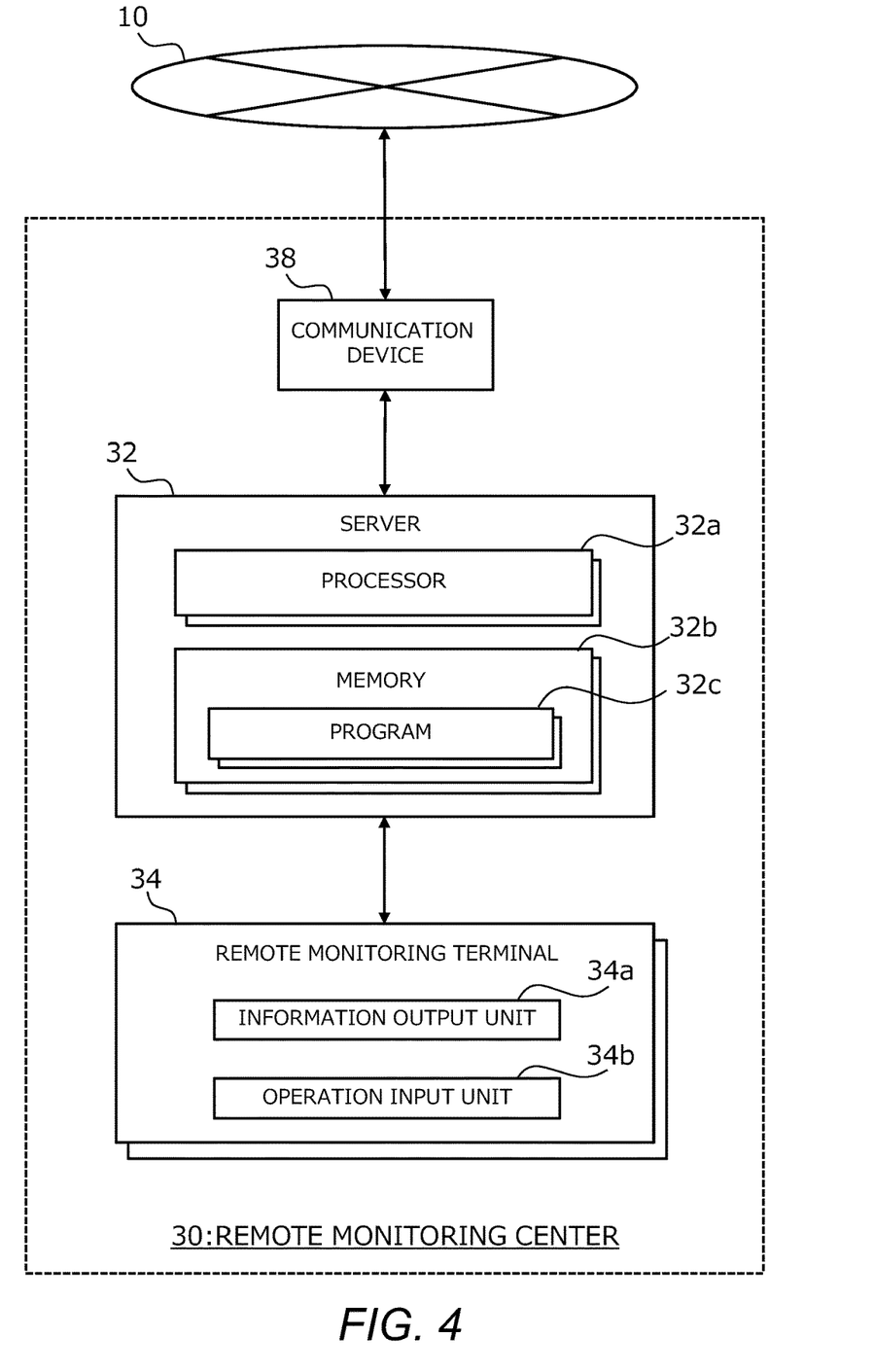
FIG. 4 is a block diagram showing an example of a configuration of a remote monitoring center.

FIG. 4 is a block diagram showing an example of a configuration of the remote monitoring center 30 in the remote monitoring system 100 according to the first embodiment. The remote monitoring center 30 includes a server 32. The server 32 may be a computer or a set of computers connected by a communication network. The remote monitoring center 30 includes a remote monitoring terminal 34 and a communication device 38. These are connected to the server 32 using the communication network. As described above, one or more remote monitoring terminal 34 may be connected to the server 32.

The server 32 includes one or more processors 32a (hereinafter simply referred to as a processor 32a) and one or more memories 32b (hereinafter simply referred to as a memory 32b) coupled to processor 32a. The memory 32b stores one or more programs 32c (hereinafter, simply referred to as a program 32c) executable by the processor 32a and various related information.

When the processor 32a executes the program 32c, various kinds of processing performed by the processor 32a are realized. The program 32c includes, for example, a program for realizing remote operation or remote assistance. The program 32c may be stored in the memory 32b or may be stored in a computer readable recording medium, which is an auxiliary storage device. The memory 32b may store a map database for managing map information for autonomous traveling. The map database may be stored in at least one of the server 32 and the on-board computer 21.

The remote monitoring terminal 34 includes an information output unit 34a. The information output unit 34a is a device for outputting information necessary for remote monitoring of the vehicle 20 to the remote operator OP. The information output unit 34a includes a display device for outputting an image. The display device can display, for example, an image of the front of the vehicle 20 captured by the camera of the vehicle 20, in addition to the above-described around-view. As the display method, for example, the same scene as when looking forward from the driver's seat of the vehicle 20 may be displayed on the display. The display may have a plurality of display screens and may display an around-view of the vehicle 20.

The remote monitoring terminal 34 includes an operation input unit 34b. The operation input unit 34b includes a device for inputting a remote operation by the remote operator OP. To simulate the operation required when the vehicle 20 is actually operated, the operation input unit 34b includes a steering wheel for steering operation, an accelerator pedal for accelerating operation, and a brake pedal for decelerating operation. If the vehicle 20 includes a transmission, the operation input unit 34b may also include a lever or switch of the transmission. In addition, other devices for inputting operations necessary for safe driving, such as an operation lever for operating the operation lever and the wiper for operating the direction indicator of the vehicle 20, are provided in the operation input unit 34b. Alternatively, the operation input unit 34b includes a device for inputting an operation for remote assistance of the remote operator OP. Examples of the input device include a button, a lever, and a touch panel. advance/stop or a lateral movement may be instructed to the vehicle 20 by the direction in which the lever is tilted. The lateral movement includes, for example, offset avoidance against an obstacle ahead, lane changing, and overtaking of a preceding vehicle.

The communication device 38 is a device for controlling communication with the outside of the remote monitoring center 30. The communication device 38 communicates with one or more vehicles 20 via the communication network 10. The information processed by the server 32 is transmitted to the vehicle 20 using the communication device 38. The information processed by the vehicle 20 is captured by the server 32 using the communication device 38.

When performing remote operation, the remote operator OP operates the operation input unit 34b while referring to the image displayed on the information output unit 34a. The server 32 of the remote monitoring center 30 acquires remote control information of the operation input unit 34b operated by the remote operator OP. Specifically, the remote control information is transmitted to the vehicle 20 via the communication network 10. The on-board computer 21 of the vehicle 20 operates the actuator 24 of the vehicle 20 based on the remote control information.

Figure 5:
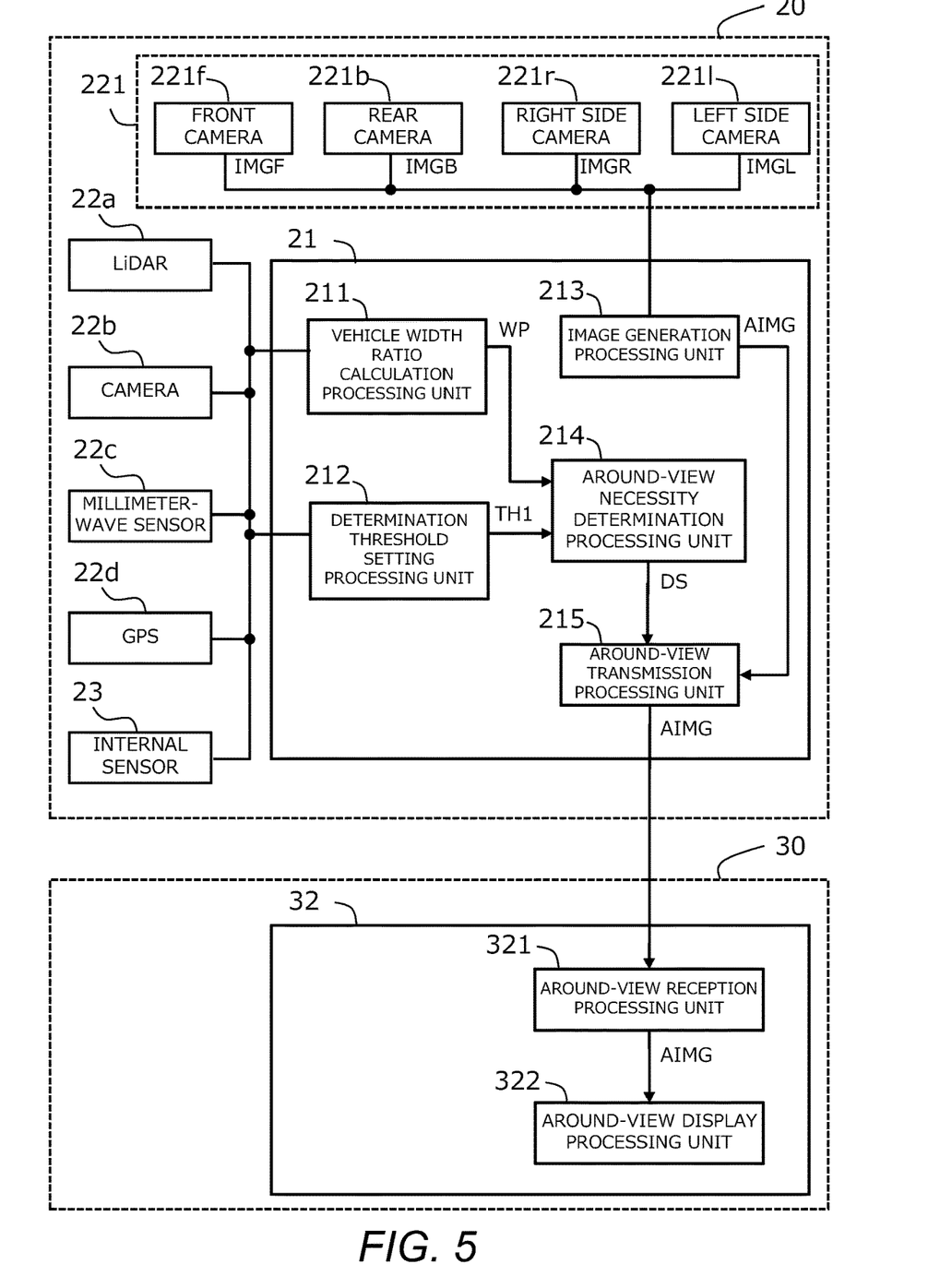
FIG. 5 is a block diagram for explaining functions of an on-board computer and functions of a server according to first embodiment.

6. Description of Remote Monitoring Method by Remote Monitoring System According to First Embodiment A remote monitoring method by the remote monitoring system can be realized by the remote monitoring system 100 having the configuration shown in FIG. 5. In FIG. 5, the functions of the on-board computer 21 and the functions of the server 32 are respectively represented by blocks. Hereinafter, the remote monitoring system 100 will be described focusing on the functions of the on-board computer 21 and the server 32. However, the configuration and functions already described will be omitted or simplified.

The on-board computer 21 includes a vehicle width ratio calculation processing unit 211, a determination threshold setting processing unit 212, an image generation processing unit 213, an around-view necessity determination processing unit 214, and an around-view transmission processing unit 215. These are realized as functions of the on-board computer 21 when the program 21c stored in the memory 21b of the on-board computer 21 is executed by the processor 21a.

The vehicle width ratio calculation processing unit 211 is a functional block for executing the vehicle width ratio calculation processing. In the vehicle width ratio calculation processing, the vehicle width ratio calculation processing unit 211 recognizes the position of the vehicle 20 on the map based on the position information of the vehicle 20 received by GPS 22d, and information about the motion of the vehicle 20 detected by the internal sensor 23, and the map information obtained from the map database. The vehicle width ratio calculation processing unit 211 may also estimate the position of the vehicle 20 from the relative position of the feature detected by the LiDAR 22a, the camera 22b, or the millimeter-wave sensor 22c with respect to the vehicle 20, information about the motion of the vehicle 20 detected by the internal sensor 23, and a position on the map of the detected feature. The map information stores information on the road width and the number of lanes corresponding to the position on the map. The vehicle width ratio calculation processing unit 211 acquires the road width and the number of lanes at the position of the vehicle 20 on the map. Then, the vehicle width ratio calculation processing unit 211 calculates the lane width per lane by dividing the acquired road width by the number of lanes. The memory 21b stores vehicle width information of the vehicle 20. The vehicle width ratio calculation processing unit 211 calculates the vehicle width ratio WP (%) to the calculated lane width also as the vehicle width ratio. Calculated vehicle width ratio WP is sent to the around-view necessity determination processing unit 214.

Figure 6:
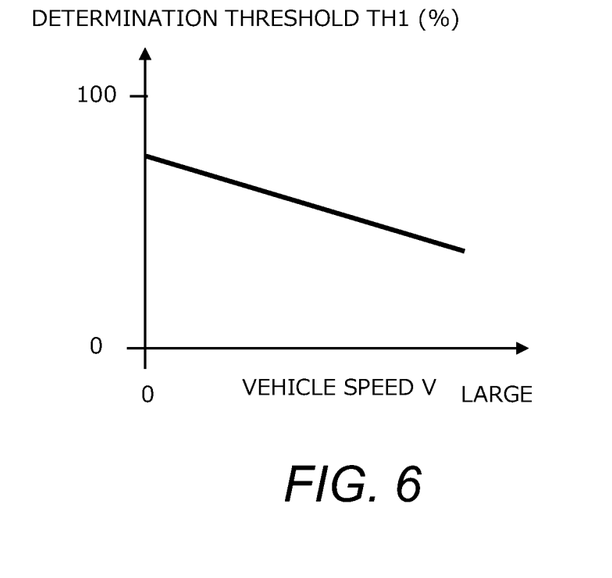
FIG. 6 is a map defining a relationship between vehicle speed V and threshold TH1.

The determination threshold setting processing unit 212 is a functional block for executing the determination threshold setting processing. In the determination threshold setting processing, the determination threshold setting processing unit 212 calculates the current vehicle speed V of the vehicle 20 based on the information about the movement of the vehicle 20 detected by the internal sensor 23. FIG. 6 is a map defining the relationship between the vehicle speed V and the determination threshold TH1. The map shown in FIG. 6 is stored in the memory 21b. In this map, the determination thresholds TH1 are defined to be smaller as the vehicle speed V is larger. The determination threshold setting processing unit 212 sets the determination threshold TH1 corresponding to the vehicle speed V in accordance with the map shown in FIG. 6. Alternatively, the determination threshold setting processing unit 212 may set a fixed value that does not depend on the vehicle speed V as the determination threshold TH1. The set determination thresholds TH1 are sent to the around-view necessity determination processing unit 214.

The image generation processing unit 213 is a functional block for executing image generation processing. In the image generation processing, the image generation processing unit 213 acquires images IMGF, IMGB, IMGR, IMGL of the imaging ranges IAF, IAB, IAR, IAL captured by the front camera 221f, the rear camera 221b, the right side camera 221r, and the left side camera 221l. Then, the image generation processing unit 213 generates one omni-directional image surrounding the entire circumference of the vehicle 20 by known image processing that combines these images. The memory 21b holds the vehicle image data in plan view of the vehicle 20. The image generation processing unit 213 generates an around-view AIMG by combining the vehicle image data in the omni-directional image. The generated around-view AIMG is sent to the around-view transmission processing unit 215.

The around-view necessity determination processing unit 214 is a functional block for executing the around-view necessity determination. In the around-view necessity determination processing unit 214 determines whether the vehicle width ratio WP is greater than the determination threshold TH1. As a result, when the vehicle width ratio WP is equal to or less than the determination threshold TH1, the around-view necessity determination processing unit 214 determines that the around-view is not required, and sends the determination result signal DS to the around-view transmission processing unit 215. On the other hand, when the vehicle width ratio WP is greater than the determination threshold TH1, the around-view necessity determination processing unit 214 determines that the around-view is required, and sends the determination result signal DS to the around-view transmission processing unit 215.

If the determination result signal DS sent from the around-view necessity determination processing unit 214 is a result signal determined that the around-view is required, the around-view transmission processing unit 215 transmits the around-view AIMG using the communication device 25 to the server 32 of the remote monitoring center 30. As described above, the on-board computer 21 according to the first embodiment functions as a remote monitoring device that provides the around-view AIMG of the vehicle 20 to the remote monitoring terminal 34.

The server 32 includes an around-view reception processing unit 321, and an around-view display processing unit 322. These are realized as functions of the server 32 when the program 32c stored in the memory 32b of the server 32 is executed by the processor 32a.

The around-view reception processing unit 321 receives the around-view AIMG using the communication device 38. The received around-view AIMG is sent to the around-view displaying processing unit 322.

The around-view display processing unit 322 displays the around-view AIMG on the information output unit 34a of the remote monitoring terminal 34. According to such control, it is possible to provide the display of the around-view to the remote operator OP at an appropriate timing according to the road structure.

7. Description of Remote Monitoring Method by Remote Monitoring System According to Second Embodiment Next, a remote monitoring method by the remote monitoring system according to a second embodiment of the present disclosure will be described with reference to FIGS. 7 and 8. In the remote monitoring method according to the first embodiment, the around-view necessity determination processing for determining the necessity of providing the around-view AIMG of the vehicle 20 is executed based on whether the vehicle width ratio WP is larger than the determination threshold TH1. In the remote monitoring method according to the second embodiment, the necessity of providing the around-view AIMG is determined according to the distance from obstacles in the traveling direction of the vehicle 20.

Figure 7:
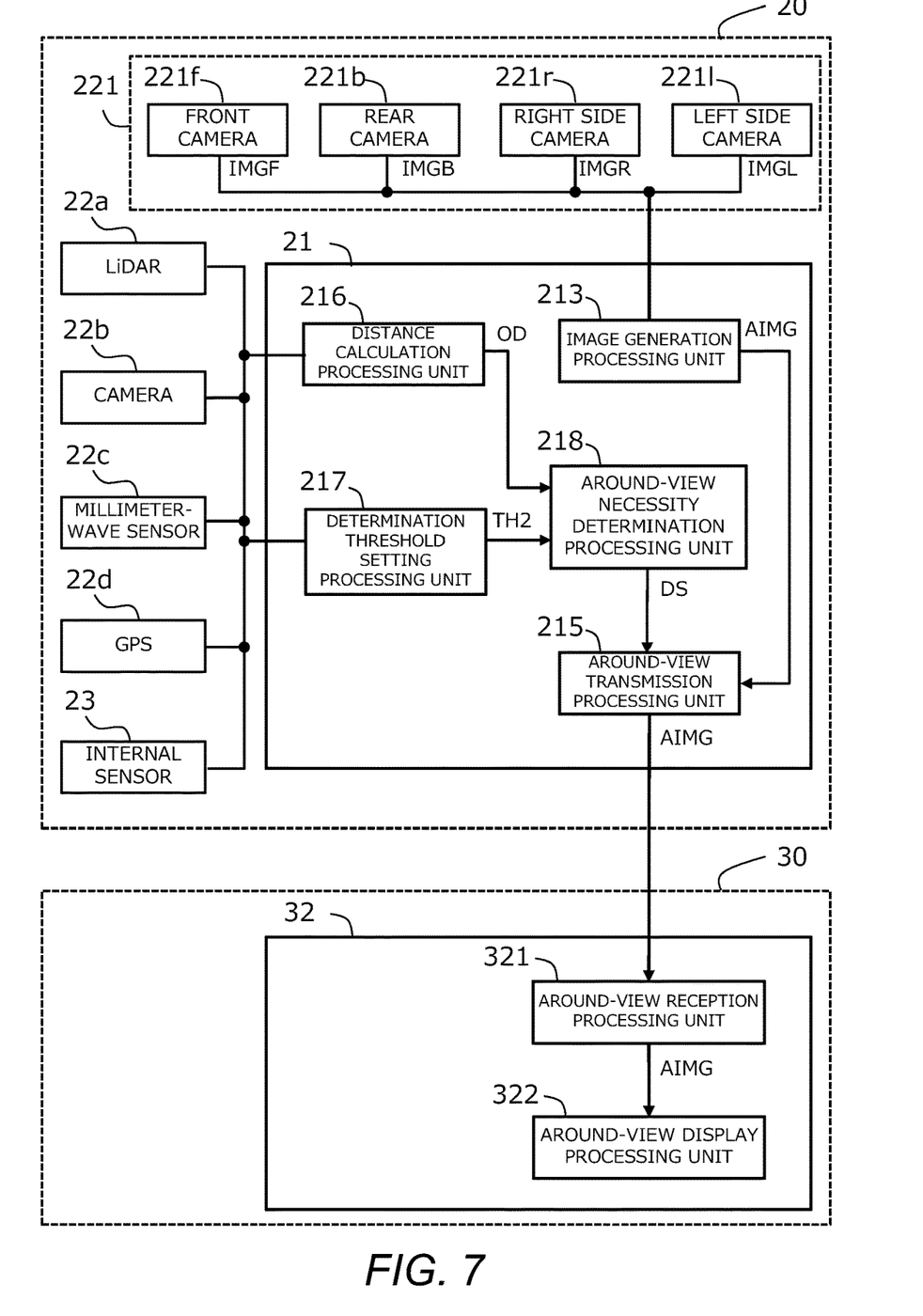
FIG. 7 is a block diagram for explaining functions of an on-board computer and a server according to second embodiment.

In FIG. 7, the functions of the on-board computer 21 according to the second embodiment and the functions of the server 32 are represented by blocks, respectively. Hereinafter, the remote monitoring system according to the second embodiment will be described focusing on the functions of the on-board computer 21 and the server 32. However, configurations and functions that have already been described are either omitted or simplified with a common reference numeral.

The on-board computer 21 according to the second embodiment is further includes a distance calculation processing unit 216, a determination threshold setting processing unit 217, and an around-view necessity determination processing unit 218 with respect to the on-board computer 21 according to the first embodiment shown in FIG. 5. These are realized as functions of the on-board computer 21 when the program 21c stored in the memory 21b of the on-board computer 21 is executed by the processor 21a.

The distance calculation processing unit 216 is a functional block for executing a distance calculation processing. In the distance calculation processing, the distance calculation processing unit 216 recognizes objects around the vehicle 20 and calculates the distance OD from the vehicle 20 using a method such as pattern matching or deep learning for the information received from the LiDAR 22a, the camera 22b, or the millimeter-wave sensor 22c. The object to be recognized by the distance calculation processing unit 216, for example, a vehicle, a motorcycle, a bicycle, a moving object such as a pedestrian, or a stationary object is included. The calculated distance OD is sent to the around-view necessity determination processing unit 218.

Figure 8:
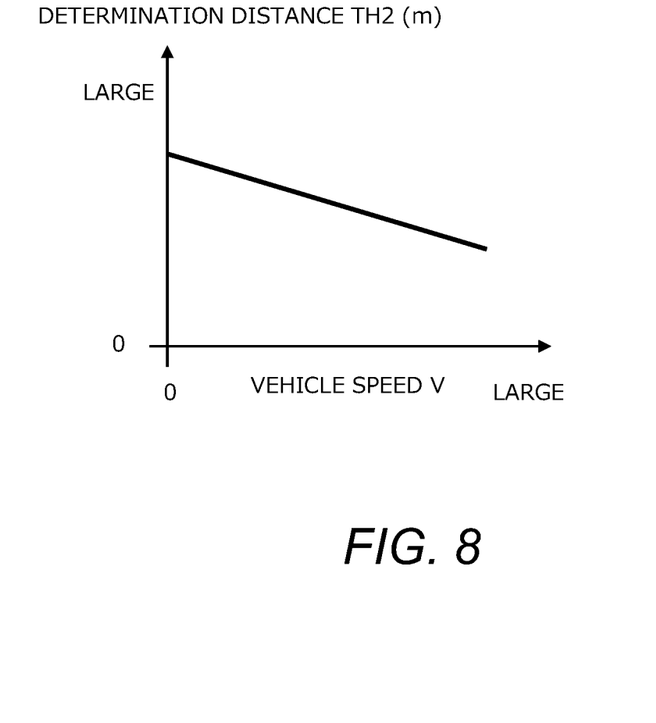
FIG. 8 is a map that defines a relationship between vehicle speed V and determination distance TH2.

The determination threshold setting processing unit 217 is a functional block for executing a setting process for setting the determination threshold of the distance OD. In the determination threshold setting processing, the determination threshold setting processing unit 217 calculates the current vehicle speed V of the vehicle 20 based on the information about the movement of the vehicle 20 detected by the internal sensor 23. FIG. 8 is a map that defines a relationship between vehicle speed V and determination distance TH2. The map shown in FIG. 8 is stored in the memory 21b. In this map, it is specified that the larger the vehicle speed V is, the smaller the determination distance TH2 is. The determination threshold setting processing unit 217 sets the determination distance TH2 corresponding to the vehicle speed V in accordance with the map shown in FIG. 8. Alternatively, the determination threshold setting processing unit 217 may set a fixed value that does not depend on the vehicle speed V as the determination distance TH2. The set determination distance TH2 is sent to the around-view necessity determination processing unit 218.

The around-view necessity determination processing unit 218 is a functional block for executing the around-view necessity determination. In the around-view necessity determination, the around-view necessity determination processing unit 218 determines whether the distance OD is smaller than the determination distance TH2. As a result, when the distance OD is equal to or greater than the determination distance TH2, the around-view necessity determination processing unit 218 determines that the around-view is not required, and sends the determination result signal DS to the around-view transmission processing unit 215. On the other hand, when the distance OD is smaller than the determination distance TH2, the around-view necessity determination processing unit 218 determines that the around-view is required, and sends the determination result signal DS to the around-view transmission processing unit 215.

According to the around-view necessity determination according to the second embodiment, it can be determined that the around-view is necessary even when the vehicle 20 approaches obstacles. This allows the remote operator OP to understand the relative position of the obstacles and the vehicle 20 by referring the around-view.

8. Other Embodiments

The server 32 may be configured as a remote monitoring device. That is, the server 32 may include all the functions as the remote monitoring device in the on-board computer 21. Alternatively, the server 32 may have a part of the function of as a remote monitoring device in the on-board computer 21, and the on-board computer 21 and the server 32 may cooperate to execute each processing.

What is claimed is:

1. A remote monitoring device that provides an around-view of an autonomous traveling vehicle to a remote monitoring terminal referred to by a remote operator that remotely monitors a traveling of the autonomous traveling vehicle, the remote monitoring device comprising:
one or more memories storing one or more programs; and
one or more processors coupled with the one or more memories,
wherein the one or more programs is configured to cause the one or more processors to execute:
acquiring data of a plurality of sensors mounted on the autonomous traveling vehicle;

executing an image generation processing to generate an around-view of the autonomous traveling vehicle by processing the data;

calculating a lane width of a lane in which the autonomous traveling vehicle travels based on map information;

calculating a vehicle width ratio of the autonomous traveling vehicle, wherein the vehicle width ratio comprises a ratio between a width of the autonomous traveling vehicle and the lane width; and providing the around-view generated by the image generation processing to the remote monitoring terminal when the vehicle width ratio is larger than a predetermined determination threshold.

2. The remote monitoring device according to claim 1, wherein the one or more processors are configured to set the determination threshold to a smaller value as a vehicle speed of the autonomous traveling vehicle increases.

3. The remote monitoring device according to claim 1, wherein the one or more processors are configured to:
calculate a distance to an obstacle in front of the autonomous traveling vehicle based on the data of the plurality of sensors; and
provide the around-view generated by the image generation processing to the remote monitoring terminal when the distance is less than a predetermined determination distance.

4. The remote monitoring device according to claim 3, wherein the one or more processors are configured to set the determination distance to a larger value as a vehicle speed of the autonomous traveling vehicle increases.

5. The remote monitoring device according to claim 1, wherein the one or more programs is configured to cause the one or more processors to execute determining whether the vehicle width ratio is larger than the predetermined determination threshold.

6. A remote monitoring system for displaying an around-view of an autonomous traveling vehicle on a remote monitoring terminal referenced by a remote operator that remotely assists in traveling the autonomous traveling vehicle, the system comprising:
an on-board computer mounted on the autonomous traveling vehicle; and
a server connected by a communication network with the on-board computer,
wherein the on-board computer and the server are configured to corporate to execute:
acquiring data of a plurality of sensors mounted on the autonomous traveling vehicle;
executing an image generation processing to generate an around-view of the autonomous traveling vehicle by processing the data;
calculating a lane width of a lane in which the autonomous traveling vehicle travels based on map information;
calculating a vehicle width ratio of the autonomous traveling vehicle, wherein the vehicle width ratio comprises a ratio between a width of the autonomous traveling vehicle and the lane width; and
causing the remote monitoring terminal to display the around-view generated by the image generation processing when the vehicle width ratio is larger than a predetermined determination threshold.

7. The remote monitoring system according to claim 6, wherein the on-board computer is configured to execute:
transmitting the around-view generated by the image generation processing to the server when the vehicle width ratio is larger than a predetermined determination threshold, and
wherein the server is configured to execute:
receiving the around-view; and
causing the remote monitoring terminal to display the around-view received.

8. A remote monitoring method for a computer to cause a remote monitoring terminal referenced by a remote operator that remotely assists in traveling the autonomous traveling vehicle to display an around-view of the autonomous traveling vehicle,
wherein the computer is configured to execute:
acquiring data of a plurality of sensors mounted on the autonomous traveling vehicle;
executing an image generation processing that processes data to generate an around-view of the autonomous traveling vehicle;
calculating a lane width of a lane in which the autonomous traveling vehicle travels based on map information;
calculating a vehicle width ratio of the autonomous traveling vehicle, wherein the vehicle width ratio comprises a ratio between a width of the autonomous traveling vehicle and the lane width; and
causing the remote monitoring terminal to display the around-view generated by the image generation processing when the vehicle width ratio is larger than a predetermined determination threshold.

* * * * *